United States Patent [19]

Laucks et al.

[11] 4,419,085
[45] Dec. 6, 1983

[54] AMPHIBIOUS VEHICLE

[75] Inventors: Rudolf Laucks, Heidenheim; Karl Blickle, Herbrechtingen-Bolheim, both of Fed. Rep. of Germany

[73] Assignee: J. M. Voith GmbH, Heidenheim, Fed. Rep. of Germany

[21] Appl. No.: 316,505

[22] Filed: Oct. 29, 1981

[30] Foreign Application Priority Data

Nov. 4, 1980 [DE] Fed. Rep. of Germany ....... 3041483

[51] Int. Cl.³ .............................................. B63H 1/08
[52] U.S. Cl. ..................................... 440/93; 114/270; 180/7 R
[58] Field of Search ....................... 440/90, 92, 93, 98, 440/100; 114/270; 180/7.1

[56] References Cited

U.S. PATENT DOCUMENTS 1,681,500 8/1928 Schneider ............................. 180/7.1
2,250,772 7/1941 Mueller et al. ........................ 440/93

FOREIGN PATENT DOCUMENTS 448525 5/1948 Canada ............................... 114/270
604616 10/1934 Fed. Rep. of Germany ........ 440/93
709253 7/1941 Fed. Rep. of Germany ........ 440/93
187364 10/1922 United Kingdom ................ 114/270

Primary Examiner—Trygve M. Blix
Assistant Examiner—Jesus D. Sotelo
Attorney, Agent, or Firm—Jeffers, Irish & Hoffman

[57] ABSTRACT

In an amphibious vehicle having driven wheels for movement along dry surfaces and a driving unit for movement through fluids, the improvement comprising at least one of the driven wheels being provided with supports and a positioning mechanism for propeller blades, which, upon rotation of the wheel, generate motion through the fluid according to the principle of cycloidal propellers. The supports for the propeller blades are arranged and constructed such that the propeller blades protrude laterally out of the wheel rim, whereby the axis of rotation of the propeller blades are inclined a small, acute angle towards the axis of the wheels.

6 Claims, 5 Drawing Figures

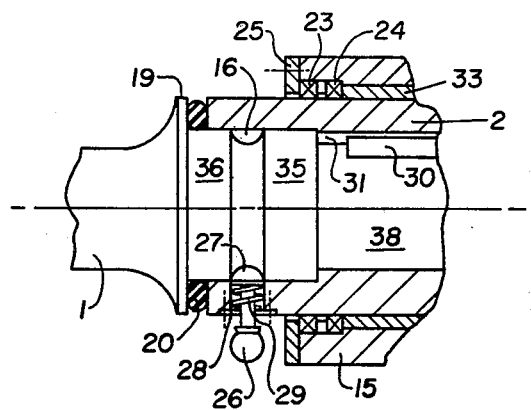
Fig. 3
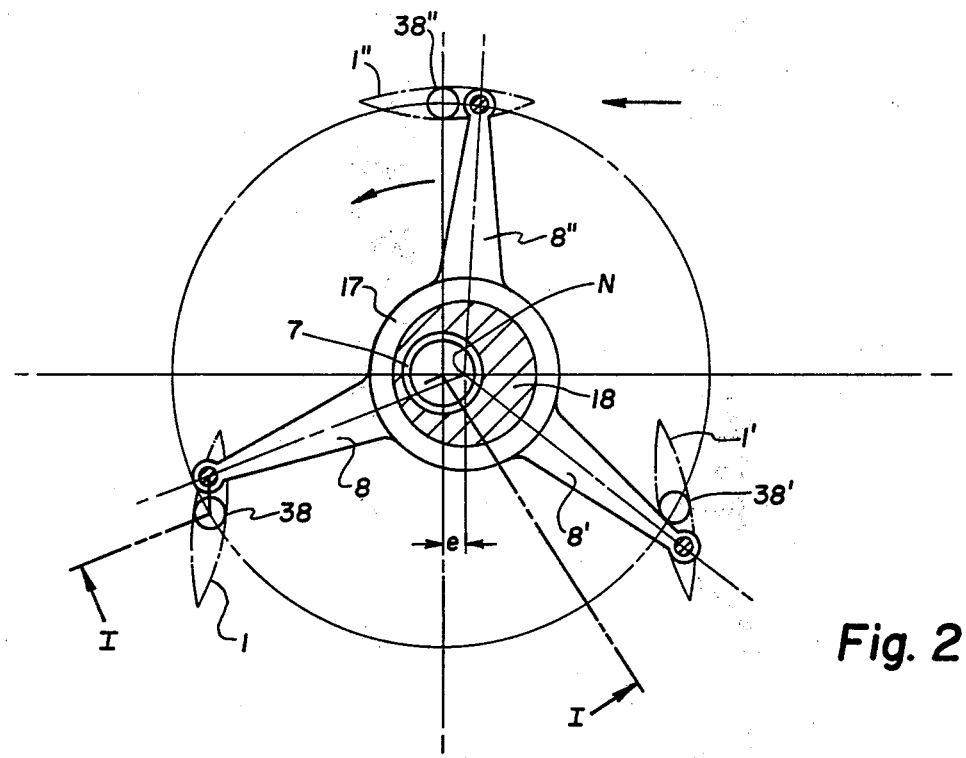
Fig. 2
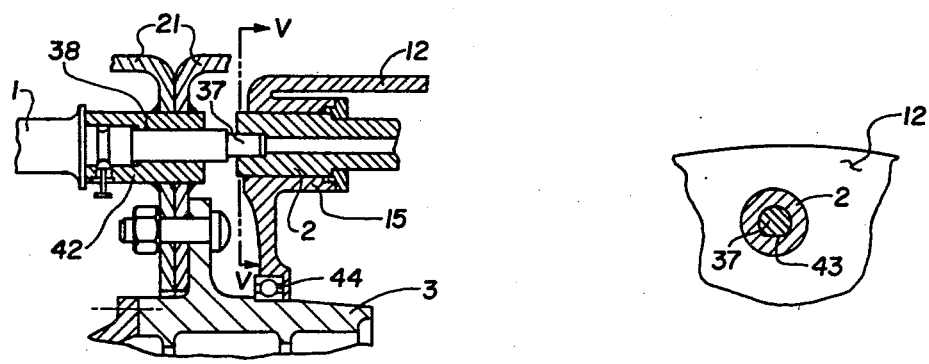
Fig. 4
Fig. 5

AMPHIBIOUS VEHICLE

The present invention relates to an amphibious vehicle having driven wheels for movement along dry surfaces and a driving unit for movement in water. At least one driven wheel is provided with supporting members and means for positioning wing blades which will generate propulsion when the wheel turns in accordance with the principle of the cycloidal propeller. Furthermore, the supporting members for the wing blades are arranged and constructed such that the blades will protrude laterally from the rim of the wheel such that the axis of rotation of the blades at the most are inclined with a small, acute angle toward the wheel axis.

A similar amphibious vehicle is disclosed in the British Pat. No. 187,364 wherein the means for positioning the propeller blades is a planetary gear device having a planet wheel and a sun wheel. The planetary gear has twice the number of teeth as that of the sun wheel so that one complete cycle of the propeller blades occurs for every two rotations of the corresponding wheel of the vehicle. When the vehicle is moved through the water, the sun wheel is made stationary by a locking lever, which by necessity is attached to the outside of the vehicle. This lever poses a great inconvenience in operating the vehicle. The elimination of the requirement of the lever in any such embodiment as above has proved difficult because of the relatively large diameter of the planet wheels. A further problem existing with the above amphibious vehicle is that the housing, which is attached to the vehicle and supports the propeller blades, protrudes outwardly from the vehicle thereby impeding the motion of the vehicle over the ground.

An object of the present invention is to provide an amphibious vehicle with a driving means of simple construction.

In the broader aspects of this invention there is provided with an amphibious vehicle having driven wheels for movement along dry surfaces and a driving unit for movement through water a plurality of wing blades concentrically attached to and extending outwardly from the wheel. In order to position the blades for propulsion purposes, the axle of the wheel is provided with an eccentric having a control ring rotatably mounted thereto and a plurality of control arms attached to the control ring and respective ones of the wing blades. Upon rotation of the wheel, the wing blades are properly positioned for providing propulsion to the vehicle by the eccentric in accordance with the principles of the cycloidal propeller and sine kinematics.

The drive according to the invention operates under the known principle disclosed in U.S. Pat. No. 1,681,500. In this regard, German Pat. No. 493,539 discloses further application of this basic principle in moving vehicles in water or in air, in hydraulic engines operated with water or fluid, in pumps, ventilators, blowers, and the like.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings, wherein:

FIG. 2 is a schematically drawn plan of the driving wheel in FIG. 1 along line II—II and viewed in the direction of the arrows;

FIG. 3 is an enlarged view of a portion of FIG. 1;

FIG. 4 is an enlarged view of a portion of a modification of the present invention; and FIG. 5 is a broken-away sectional view of FIG. 4 taken along line v—v viewed in the direction of the arrows.

DESCRIPTION OF A SPECIFIC EMBODIMENT

Figure 1:
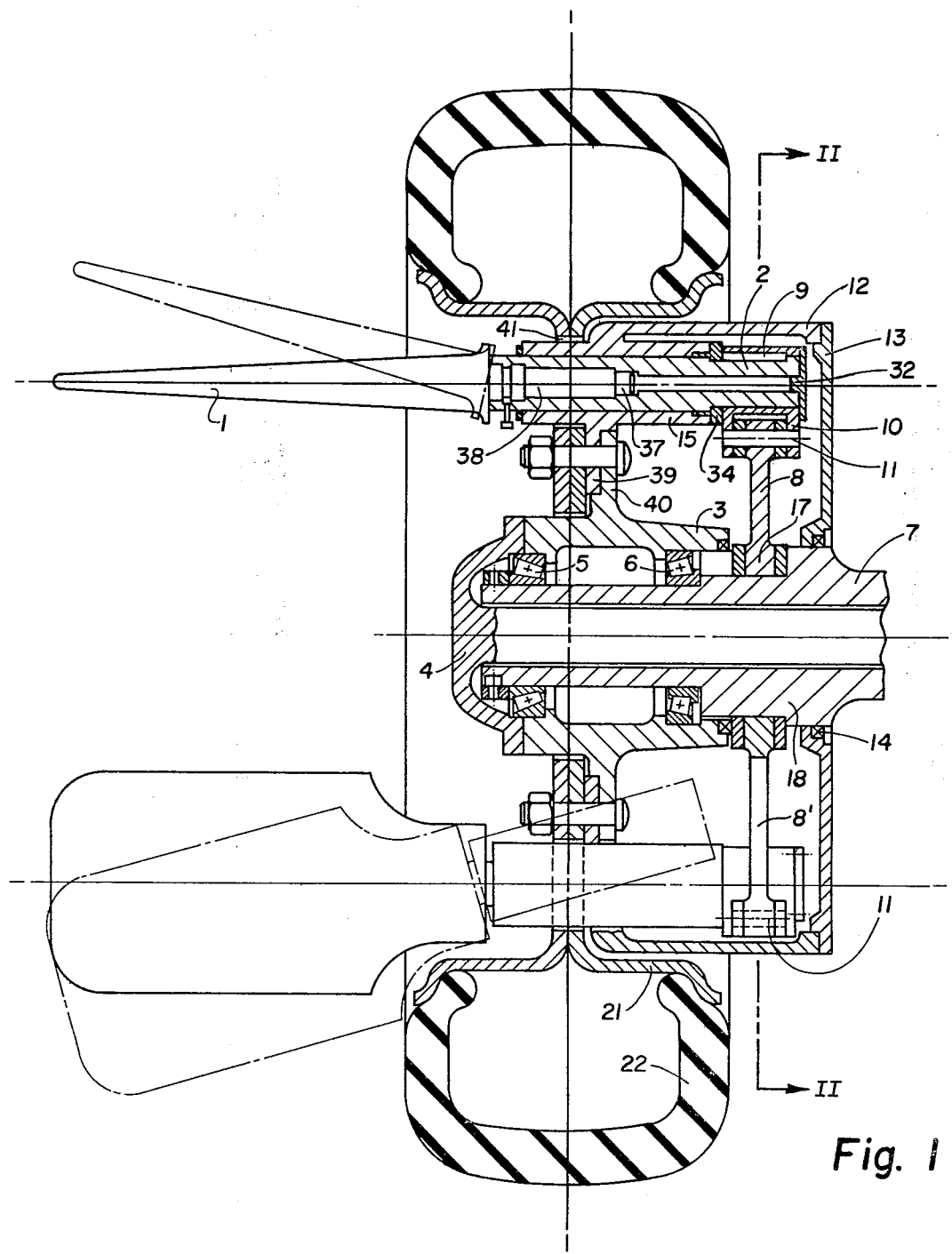
FIG. 1 is a cross-section through a driving wheel or gear of the amphibious vehicle along line I—I in FIG. 2 and viewed in the direction of the arrows.

Referring now to FIG. 1, flange 40 of wheel hub 3 has secured thereto by screws, rim 21 which carries tire 22 thereon and flange 39 of cup-shaped blade support 12. Flange 39 and blade support 12 contain therein the guide portions and control parts for propeller blade 1, and are sealed inwardly of rim 21 by a lid 13. Propeller blade 1 has an attachment part 38 which is secured to the vehicle wheel by the interposition of retention bushing 2 inside supporting cylinder 15 of blade support 12. Supporting cylinder 15 of blade support 12 protrudes through hole 41 in rim 21, which is attached to wheel hub 3. Attachment part 38 is guided within retention bushing 2 by a guide-foot part 37 attached to attachment part 38, and, to prevent twisting of propeller blade 1 within retention bushing 2, a wedge or key 30 is engaged into groove 31 of retention bushing 2 (FIG. 3). Propeller blade 1 has a shoulder 19 and is sealed off against supporting cylinder 15 by a seal 20 adjacent to and pressed against shoulder 19 of blade 1. In addition, the other side of the wheel is sealed by a gasket 14 between lid 13 of blade support 12 and axle 7 of the wheel. It is important to note that retention bushing 2 is supported in a manner which allows it to rotate within supporting cylinder 33, FIG. 3, and a corresponding protrusion of sole plate 34 of support cylinder 15. Wheel axle 7 is hollow and has extending across its end driving shaft 4 of the vehicle wheel. Wheel hub 3 of the vehicle wheel is supported upon wheel axle 7 by use of tapered roller bearings 5 and 6. As described, propeller blade 1 turns in the same direction as the wheel of the vehicle.

Attachment part 38 of propeller blade 1 is controlled by driving lever 10, which is rigidly attached to retention bushing 2 by a fitting key or wedge 9. In addition, driving lever 10 is supported at its ends by maintaining contact with sole plate 34 which supports retention bushing 2, and closure plate 32, and further has control arm 8 attached thereto by bolt 11. As described, the above elements are integral in turning propeller blade 1 one cycle during each rotation of the wheel.

Referring now to FIG. 2, stationary wheel axle 7 has secured thereto eccentric 18 around which a control ring 17 is rotatably attached. It should be noted that control ring 17 rotates relative to eccentric 18. Connected to control ring 17 are control arms 8, 8' and 8" for controlling propeller blades 1, 1' and 1", respectively.

The operation of the invention will now be described in reference to FIG. 2. Drawn in dashed lines and connected to the ends of control arms 8, 8' and 8" are propeller blades 1, 1' 1", respectively. Drawn within each propeller blade 1, 1', 1" are attachment parts 38, 38', 38", which are each concentrically supported within a hole 41. As described, attachment parts 38, 38', 38" are concentric with axle 7, and upon rotation their centers describe the circle drawn in FIG. 2. As the wheel turns counterclockwise, control ring 17 rotates relative to eccentric 18. The position of a propeller blade with respect to its control arm at the top of the rotation is illustrated by control arm 8" and propeller blade 1". As the wheel rotates counterclockwise, control ring 17 rotates about eccentric 18 thereby causing the control arm to effectively shorten in relation to wheel axle 7. As the control arm shortens during the rotation, it draws radially inwardly driving lever 10, thereby causing the propeller blade to rotate clockwise within hole 41. This position of the propeller blade and the control arm is illustrated by control arm 8 and propeller blade 1. As the wheel continues to rotate, control ring 17 continues its relative rotation about eccentric 18 causing the control arm to effectively increase in length. As the control arm effectively lengthens radially outwardly it pushes against driving lever 10, thereby causing propeller blade 1 to rotate in a counterclockwise manner. This position of the propeller blade and control arm is illustrated by control arm 8" and propeller blade 1' in FIG. 2.

As the wheel continues its counterclockwise rotation, control ring 17 continues to rotate around eccentric 18, thereby causing the control arm to effectively decrease in length. As the control arm rotates to the 12 o'clock position, the relationship between the propeller blade and the control arm is again illustrated by control arm 8" and propeller blade 1".

As above described, it is seen that the rotation of the propeller blades in one direction and then in the opposite direction is accomplished by the effective shortening and lengthening of control arms 8, 8', 8" as they act upon driving lever 10 causing it to be drawn radially inwardly and then pushed radially outwardly, respectively. The motion of the vehicle will then be from the right to the left as indicated by the arrow outside the circle in FIG. 2.

The above description and operation of the invention is called "sine kinematics", because of the course of the angle of incidence of the propeller blade 1 with respect to the flow of the fluid. Because the construction herein is rather simple, the efficiency is slightly less than those of other control kinematics. However, for the purposes of the invention herein, the efficiency is deemed acceptable.

It is preferred that propeller 1 have a symmetrical profile so that it may be used for both directions of rotation, thereby providing propulsion to the vehicle in the forward and backward directions. This symmetrical preference is required herein because the eccentricity e of control point N of the eccentric 18 has been fixed, i.e., eccentric 18 is always directed toward the same side of axle 7. In structures such as carrying wings or hydrofoils, which involve complex kinematics, one could provide an adjustable eccentricity e and propeller blades with profiles having a higher efficiency in relation to the flow of the fluid. However, for the application visualized herein such construction is too complicated and unnecessary. The structure illustrated in FIG. 2 having three propeller blades is quite effective and results in relatively uniform thrust behavior.

Referring now to FIG. 3, propeller blade 1 is adapted to be easily installed and removed. An annular groove 16 having a catch-base 27 is machined in attachment part 38 of propeller blade 1 between supporting shoulders 35 and 36. Engaged within catch-base 27 is a spring-loaded catch 26, which is under the action of a cylindrical, helical spring 29 supported by a mechanism plate. Also provided, are gaskets 23, 24 which are pressed by pressure plate 25 against a thrust piece or supporting cylinder 33, which is defined inside supporting cylinder 15. Because of this particular construction, propeller blade 1 may be rapidly and easily inserted or removed.

According to the invention, the propeller blades are provided on the front-driven wheels, which are controlled by a steering mechanism, so that the movement of the vehicle through the water may be controlled by the steering mechanism.

The constant amplitude resulting from the fixed control point according to the invention, i.e., the use of a rigid eccentric, does not damage the vehicle because the wheel drives employed are, as a rule, designed for a heavier change of RPM which also allows adjustment of the speed of the vehicle in the water As indicated in FIG. 1, the propeller blade 1 may be placed under an inclination of about ten degrees (10°) to about 20 degrees relative to the axis of the wheel in order to enlarge the jet surface of the propeller propulsion.

While there has been described above the principles of this invention in connection with a specific embodiment, it is to be clearly understood that this description is made only by way of example and not as a limitation to the scope of the invention.

In FIGS. 4 and 5, which latter is a cross-section along line V—V in FIG. 4, is in detail shown a modification of the invention, where the blade support means 42 are fastened to the rim 21 of the wheel by welding, as shown. The control means 37 of the blade attachment parts 38 is received in the above described manner in the retention bushing 2 of the support 12. By means of the flattened side 43 of the control means 37 the blade can be turned by the driving lever 10 via the retention bushing 2. An additional roller bearing 44 is provided for supporting the cup-like support 12.

What is claimed is:

1. In an amphibious vehicle having driven wheels connected to respective driving shafts for movement along dry surfaces and driving means for movement in a fluid, wherein at least one of said driven wheels has a rim connected to a hub and is provided with a plurality of propeller blades on supporting means attached to said at least one driven wheel and means for adjusting the position of said propeller blades relative to said at least one driven wheel, said propeller blades generating propulsion upon rotation of said at least one driven wheel in accordance with the principle of cycloidal propellers and supported by said supporting means such that said propeller blades substantially protrude axially outwardly, the improvement comprising:

said propeller blades having respective control portions and respective attachment portions thereon, a pluality of blade-receiving means, each said blade receiving means comprising a cup-shaped blade support means connected to said hub for receiving therein said control portion and the outer end of said attachment portion of a respective one of said propeller blades, said cup-shaped blade support means being concentrically connected to one of said at least one driven wheel and said driving shaft therefor on the side of said at least one driven wheel located towards the center axis of said vehicle, said propeller blades being receivable in respective said cup-shaped blade support means from the side of said at least one driven wheel opposite the center axis of said vehicle, a hollow wheel axle connected to said at least one driven wheel and receiving said driving shaft therein, an eccentric on said hollow wheel axle and being of sine kinematics having a substantially rigidly defined, unchangeable eccentricity, a control ring rotatably mounted around said eccentric, and a plurality of control arms connected between and to said control ring and respective said propeller blades for the operation thereof.

2. The vehicle of claim 1 wherein said rim is constructed so as to receive and drive said propeller blades.

3. The vehicle of claim 2 wherein said propeller blades are received in said rim to provide directional control to said vehicle.

4. The vehicle of claim 1 wherein said means for adjusting the position of said propeller blades turns said propeller blades one cycle for each rotation of said at least one driven wheel in accordance with sine kinematics.

5. The vehicle of claim 1 wherein the axes of rotation of said propeller blades form with the axis of said at least one driven wheel respective small-acute angles such that said propeller blades are positioned farther outwardly radially from said wheel axis than said attachment parts of said blades.

6. The vehicle of claim 1 wherein said propeller blades are removably received within respective said blade support mens for easy installation and removal thereof.

* * * * *

UNITED STATES PATENT AND TRADEMARK OFFICE
CERTIFICATE OF CORRECTION

PATENT NO. : 4,419,085
DATED : December 6, 1983
INVENTOR(S) : Rudolf Laucks et al.

It is certified that error appears in the above—identified patent and that said Letters Patent is hereby corrected as shown below:

Claim 1, Column 4, line 58, change "pluality" to --plurality--.

Claim 6, Column 6, line 17, change "mens" to --means--.

Signed and Sealed this

Sixth Day of March 1984

[SEAL]

Attest:

GERALD J. MOSSINGHOFF

*Attesting Officer*  *Commissioner of Patents and Trademarks*